US011150484B2

(12) United States Patent
Saha et al.

(10) Patent No.: US 11,150,484 B2
(45) Date of Patent: Oct. 19, 2021

(54) SYSTEM AND METHOD FOR CURVED LIGHT SHEET PROJECTION DURING TWO-PHOTON POLYMERIZATION

(71) Applicants: Sourabh Saha, Livermore, CA (US); Shih-Chi Chen, Shatin (HK); Yina Chang, Shatin (HK)

(72) Inventors: Sourabh Saha, Livermore, CA (US); Shih-Chi Chen, Shatin (HK); Yina Chang, Shatin (HK)

(73) Assignee: Lawrence Livermore National Security, LLC, Livermore, CA (US)

( * ) Notice: Subject to any disclaimer, the term of this patent is extended or adjusted under 35 U.S.C. 154(b) by 284 days.

(21) Appl. No.: 15/983,872

(22) Filed: May 18, 2018

(65) Prior Publication Data

US 2019/0353913 A1    Nov. 21, 2019

(51) Int. Cl.
| | | |
|---|---|---|
| *G02B 27/10* | (2006.01) |
| *G02B 26/08* | (2006.01) |
| *G02B 27/14* | (2006.01) |
| *B23K 26/06* | (2014.01) |
| *B33Y 30/00* | (2015.01) |

(Continued)

(52) U.S. Cl.
CPC ............ *G02B 27/106* (2013.01); *B23K 26/06* (2013.01); *B23K 26/067* (2013.01); *B23K 26/073* (2013.01); *B23K 26/355* (2018.08); *B29C 64/135* (2017.08); *B29C 64/268* (2017.08); *B29C 64/286* (2017.08); *B33Y 30/00* (2014.12); *G02B 26/0833* (2013.01); *G02B 27/14* (2013.01)

(58) Field of Classification Search
CPC .. G02B 26/0833; G02B 27/106; G02B 30/00; G02B 30/56; B29C 64/135; B29C 64/268; B29C 64/277; B29C 64/286; B33Y 30/00
See application file for complete search history.

(56) References Cited

U.S. PATENT DOCUMENTS

| 5,739,898 A | 4/1998 | Ozawa et al. |
| 7,902,526 B2 | 3/2011 | Kim et al. |

(Continued)

OTHER PUBLICATIONS

International Search Report and Written Opinion for Corresponding Application No. PCT/US2019/013760, dated Apr. 29, 2019.

(Continued)

*Primary Examiner* — Philip C Tucker
*Assistant Examiner* — Jimmy R Smith, Jr.
(74) *Attorney, Agent, or Firm* — Harness, Dickey & Pierce, P.L.C.

(57) ABSTRACT

A laser-based manufacturing system is disclosed for fabricating non-planar three-dimensional layers. The system may have a laser for producing a laser beam with a plurality of optical wavelengths. An optically dispersive element may be used for receiving the laser beam and splitting the beam into a plurality of distinct beam components, wherein each beam component has spatially separated optical spectral components. A phase mask may be used which is configured to receive at least one of the beam components emerging from the dispersive element and to create a modified beam. One or more focusing elements may then be used to receive the modified beam emerging from the phase mask and to focus the modified beam into a non-planar light sheet for use in fabricating a part.

19 Claims, 10 Drawing Sheets

(51) Int. Cl.
*B23K 26/073* (2006.01)
*B23K 26/352* (2014.01)
*B29C 64/268* (2017.01)
*B29C 64/135* (2017.01)
*B23K 26/067* (2006.01)
*B29C 64/286* (2017.01)

(56) References Cited

U.S. PATENT DOCUMENTS

| | | | |
|---|---|---|---|
| 9,018,562 B2* | 4/2015 | Dantus | B23K 26/0853 219/121.76 |
| 2009/0250635 A1 | 10/2009 | Sykora et al. | |
| 2009/0278058 A1 | 11/2009 | Kim et al. | |
| 2012/0295185 A1 | 11/2012 | Chang et al. | |
| 2016/0033874 A1 | 2/2016 | Tang et al. | |
| 2016/0199935 A1 | 7/2016 | Chen et al. | |
| 2016/0271727 A1 | 9/2016 | Courvoisier et al. | |
| 2018/0015672 A1* | 1/2018 | Shusteff | B29C 64/268 |
| 2018/0257297 A1* | 9/2018 | Matheu | A61L 27/507 |

OTHER PUBLICATIONS

Zhang, C., Hu, Y., Li, J., Lao, Z., Xu, B., Ni, J., Cai, Z., Wu, D., and Chu, J., 2016, "Single-exposure multiphoton fabrication of polygonized structures by an SLM-modulated Fresnel zone lens," Optical Engineering, 55(3), pp. 035102-035102.

Yang, L., Li, J., Hu, Y., Zhang, C., Lao, Z., Huang, W., and Chu, J. "Projection two-photon polymerization using a spatial light modulator." Optics Communications, 331, 2014, pp. 82-86.

Yang, L., El-Tamer, A., Hinze, U., Li J., Hu Y., Huang, W., Chu, J, and Chichkov BN. "Parallel direct laser writing of micro-optical and photonic structures using spatial light modulator." Optics and Lasers in Engineering, 70, 2015, pp. 26-32.

Li , Yi-Cheng, Cheng, Li-Chung, CChang, Chia-Yuan, Lien, Chi-Hsiang, Campagnola, P. J, and Chen, S-J. "Fast multiphoton microfabrication of freeform polymer microstructures by spatiotemporal focusing and patterned excitation." Optics Express, 20(17), 2012, pp. 19030-19038.

Gittard, S. S. D., Nguyen, A., Obata, K., Koroleva, A., Narayan, R. J., and Chichkov, B. N. "Fabrication of microscale medical devices by two-photon polymerizatiion with multiple foci via a spatial light modulator," Biomedical optics express, 2(11), 2011, pp. 3167-3178.

Vizsnyiczai, G., Kelemen, L., and Ormos, P. "Holographic multi-focus 3D two-photon polymerization with real-time calculated holograms," Opt. Express, 22(20), 2014, pp. 24217-24223.

Mills, B., Grant-Jacob, J. A., Feinaeugle, M., and Eason, R. W., 2013, "Single-pulse multiphoton polymerization of complex structures using a digital multimirror device," Opt. Express, 21(12), pp. 14853-14858.

* cited by examiner

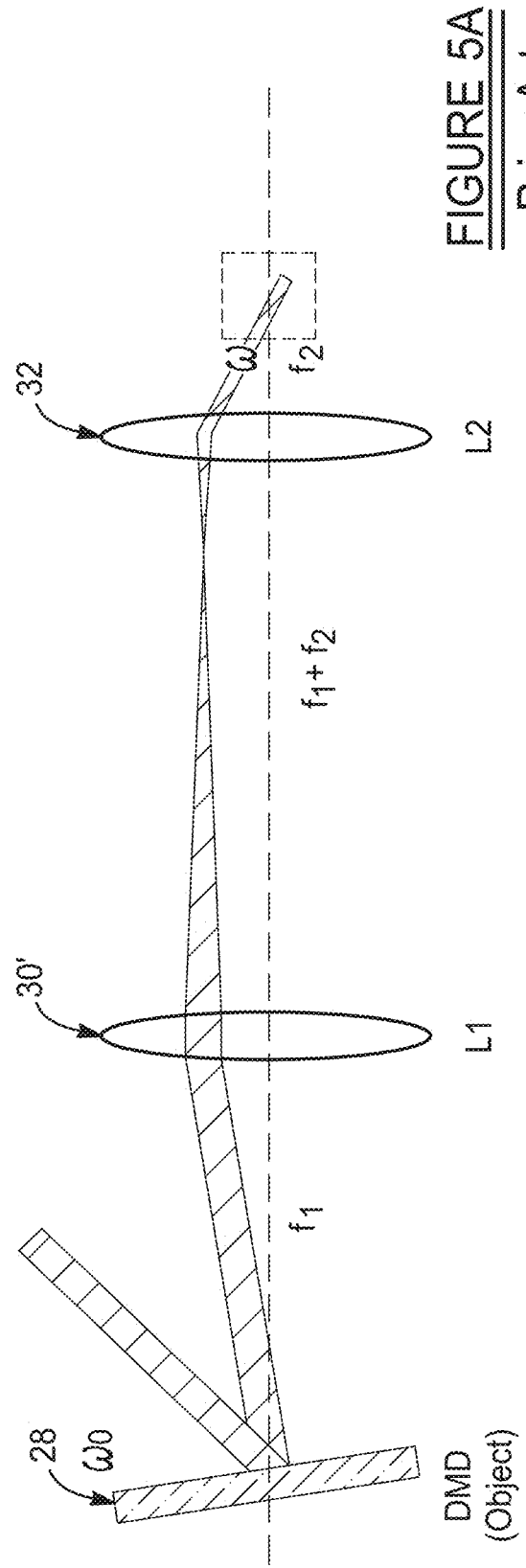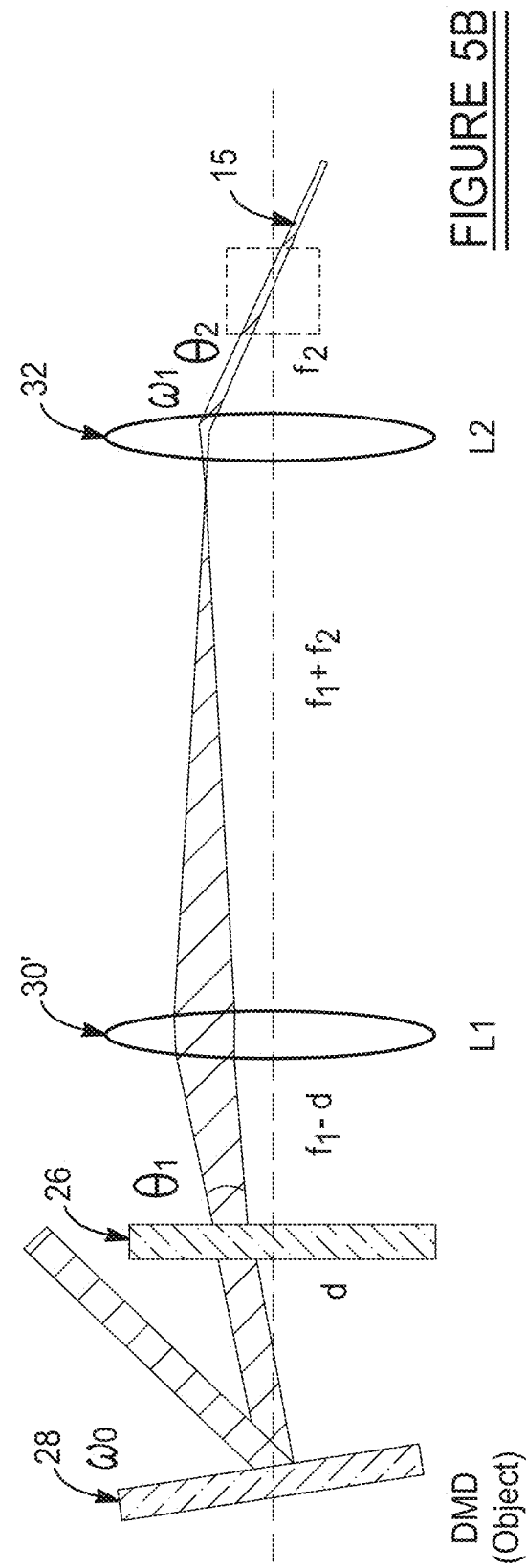

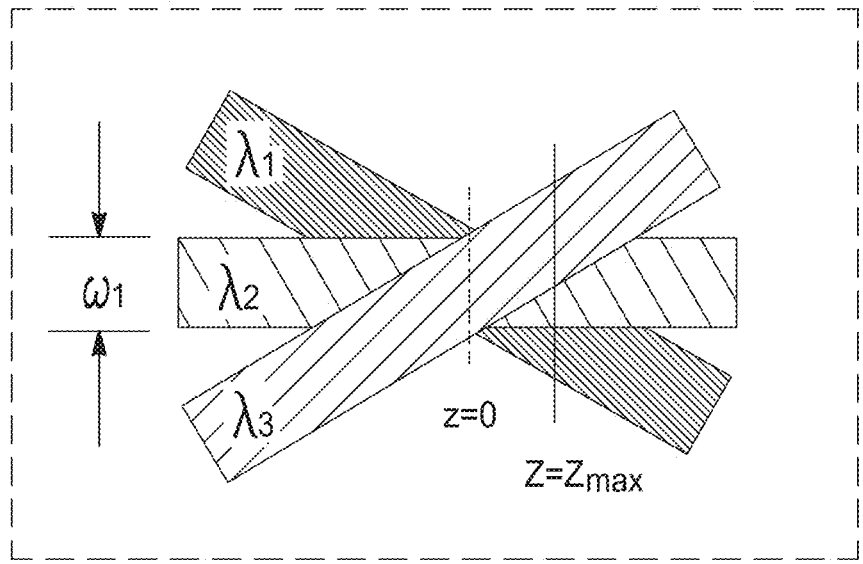
FIGURE 5C1
Prior Art
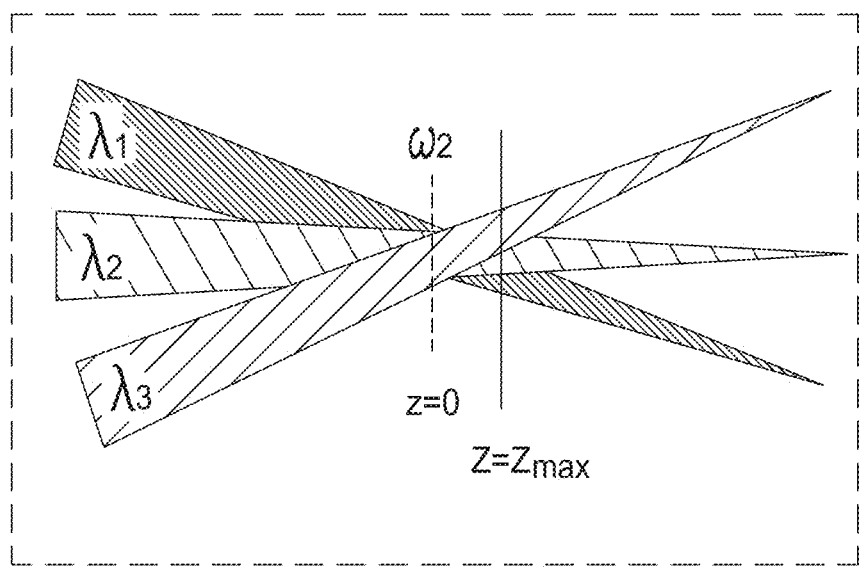
FIGURE 5C2

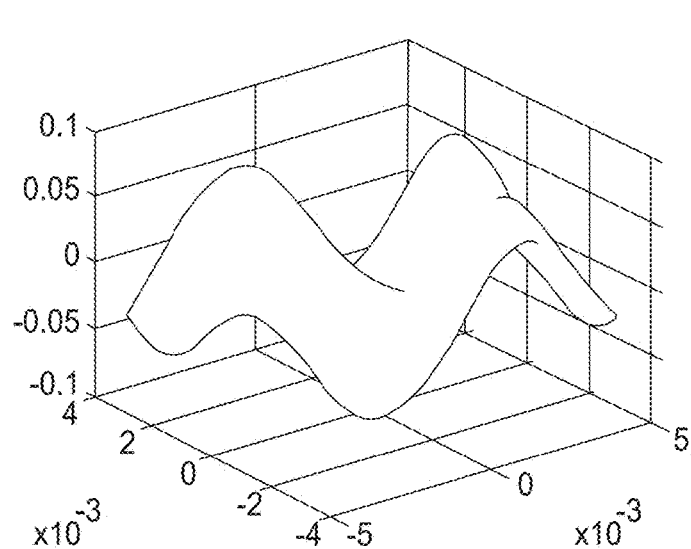
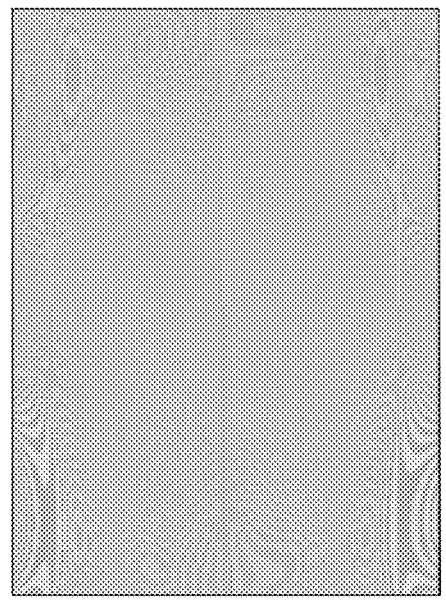
FIGURE 7C
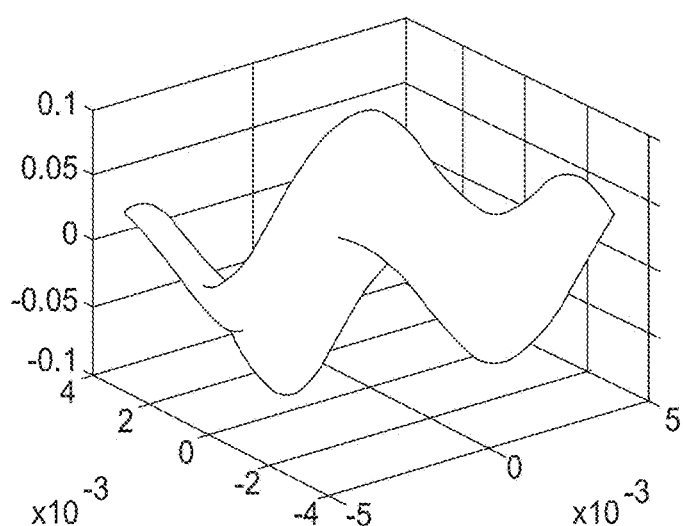
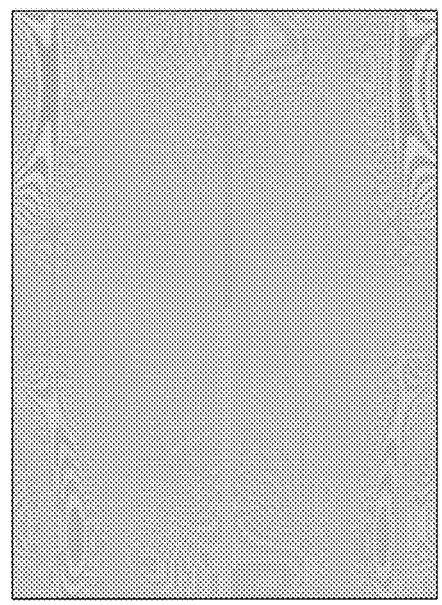
FIGURE 7D

SYSTEM AND METHOD FOR CURVED LIGHT SHEET PROJECTION DURING TWO-PHOTON POLYMERIZATION

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to additive manufacturing ("AM") systems and methods, and more particularly to systems and methods for printing non-planar surfaces.

BACKGROUND

This section provides background information related to the present disclosure which is not necessarily prior art.

Two-photon lithography (TPL) is a popular technique to additively manufacture complex 3D structures with submicron building blocks. This technique uses a nonlinear photoabsorption process to polymerize submicron features within the interior of the photopolymer resist material. After illumination of the desired structures inside the photoresist volume and subsequent development (washing out the non-illuminated regions), the polymerized material remains in the prescribed three-dimensional form.

A key limitation of TPL (and other additive manufacturing techniques) is the discretization of features during printing. This discretization manifests in the form of rough external and internal surfaces that often have an adverse effect on function. The error due to discretization is amplified when these surfaces are in the form of curved surfaces (such as spherical or cylindrical surfaces). The challenge of performing projection of curved surfaces during two-photon lithography (TPL) has not been solved in the past. Prior art systems and methods for parallel TPL are lacking in the ability to polymerize arbitrarily-shaped curved surfaces with micron scale depth resolvability.

Accordingly one important improvement that would be desirable for TPL would be to modify the TPL process in such a way that it eliminates the need for discretization of curved features while maintaining the sub-micron feature resolution of the technique.

SUMMARY

This section provides a general summary of the disclosure, and is not a comprehensive disclosure of its full scope or all of its features.

In one aspect, the present disclosure relates to a laser-based manufacturing system for fabricating non-planar three-dimensional layers. The system may comprise a laser for producing a laser beam with a plurality of optical wavelengths, an optically dispersive element, and a phase mask. The optically dispersive element may operate to receive the laser beam and to split the beam into a plurality of distinct beam components, wherein each beam component has spatially separated optical spectral components. The phase mask may be configured to receive at least one of the beam components emerging from the dispersive element. The system may also include one or more focusing elements configured to receive a modified beam emerging from the phase mask and to focus the modified beam into a non-planar light sheet.

In another aspect, the present disclosure relates to a laser-based manufacturing system for fabricating non-planar three-dimensional layers. The system may comprise a laser for producing a laser beam with a plurality of optical wavelengths, an optically dispersive element, a digitally tunable mask a controller, and a focusing subsystem. The optically dispersive element may be configured to receive the laser beam and to split the laser beam into a plurality of distinct beam components, wherein each beam component has spatially separated optical spectral components. The digitally tunable phase mask may be configured to receive at least one of the beam components emerging from the dispersive element. The controller may be configured for controlling the phase mask. And the focusing subsystem may include a mirror and an objective lens configured to receive a modified beam emerging from the phase mask and to focus the modified beam into a non-planar light sheet.

In still another aspect, the present disclosure relates to a method for fabricating non-planar three-dimensional layers using a photo responsive material. The method may comprise generating a laser beam having a plurality of optical wavelengths. The method may further include using an optically dispersive element to receive the laser beam and splitting the laser beam into a plurality of distinct beam components, wherein each beam component has spatially separated optical spectral components. The method may further include receiving at least one of the beam components emerging from the dispersive element with a phase mask and using the phase mask to produce a modified beam having a phase pattern. The method may further include using one or more focusing elements configured to receive the modified beam emerging from the phase mask and to focus the modified beam into a non-planar light sheet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5A shows the temporal focusing performance without a phase mask;

FIG. 5B shows the temporal focusing performance with a phase mask;

Figure 1:
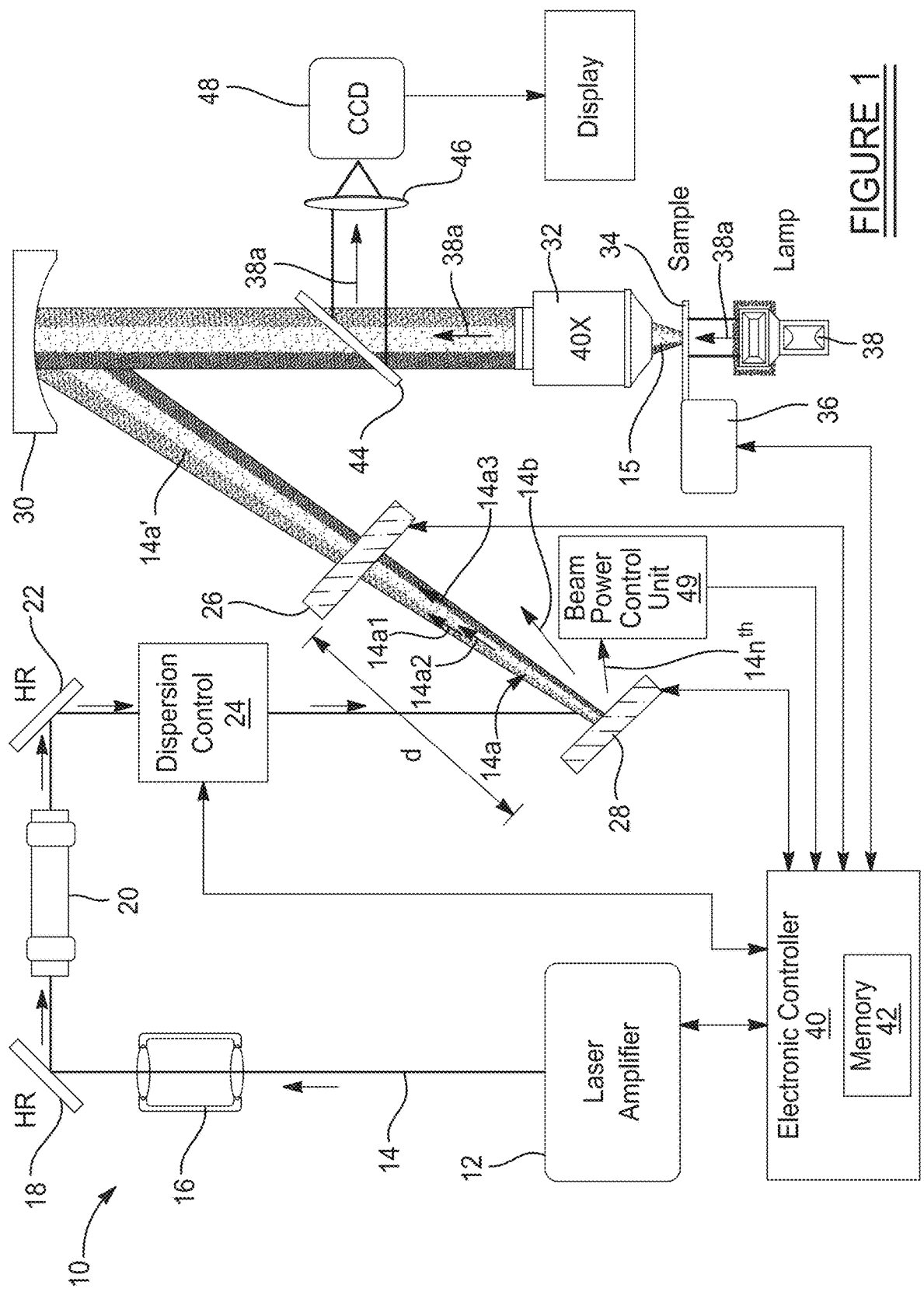
FIG. 1 is a high level block diagram of one embodiment of a system in accordance with the present disclosure for generating a non-planar light sheet for use in a fabrication operation, for example in an additive manufacturing fabrication operation to form a 3D part.
Figure 6:
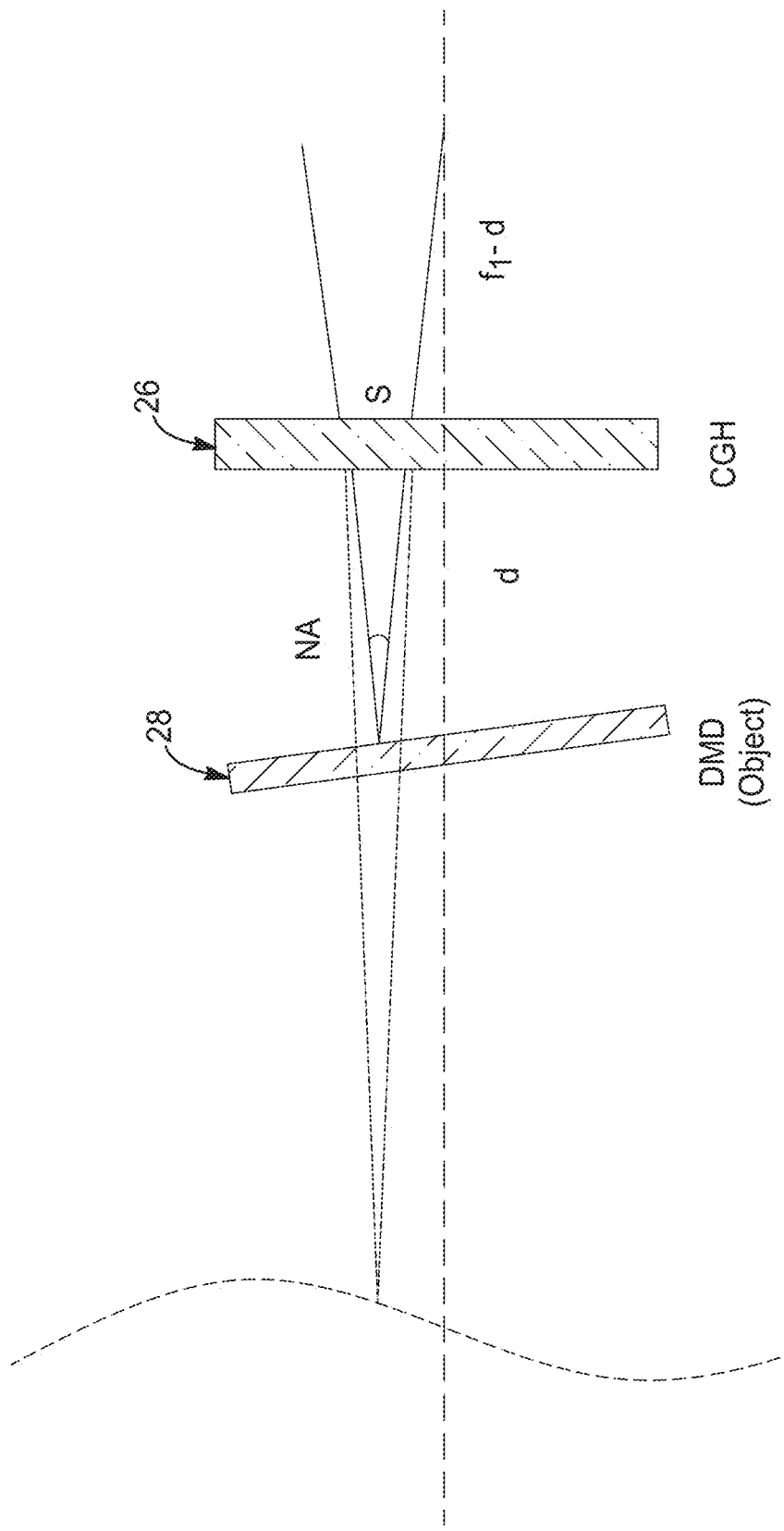
Figure 7A:
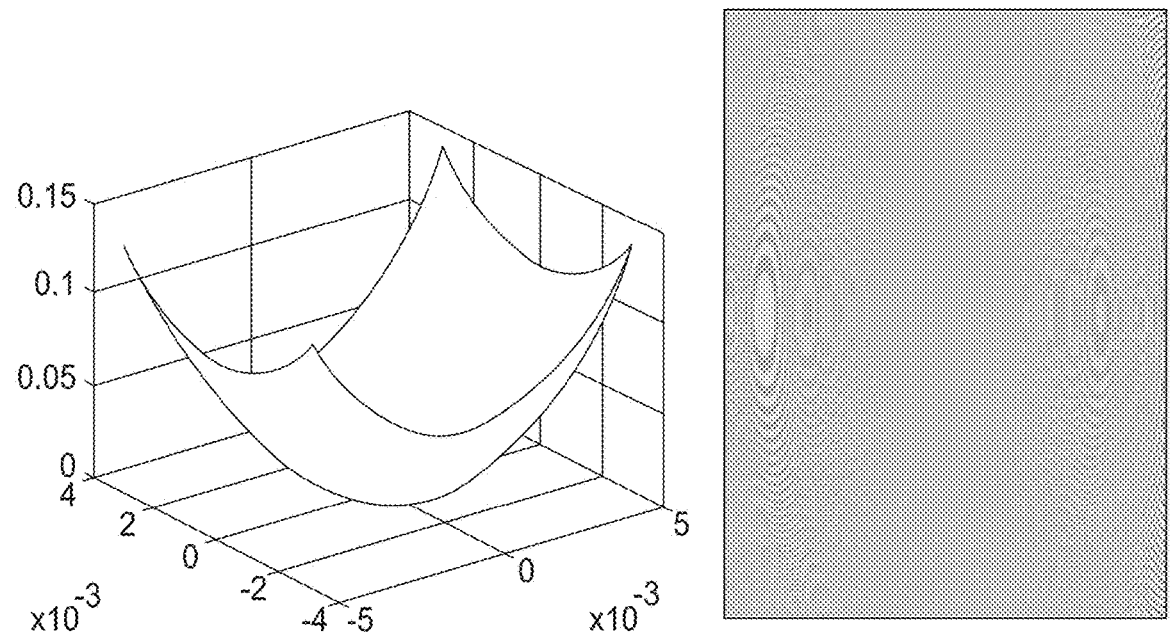
Figure 7B:
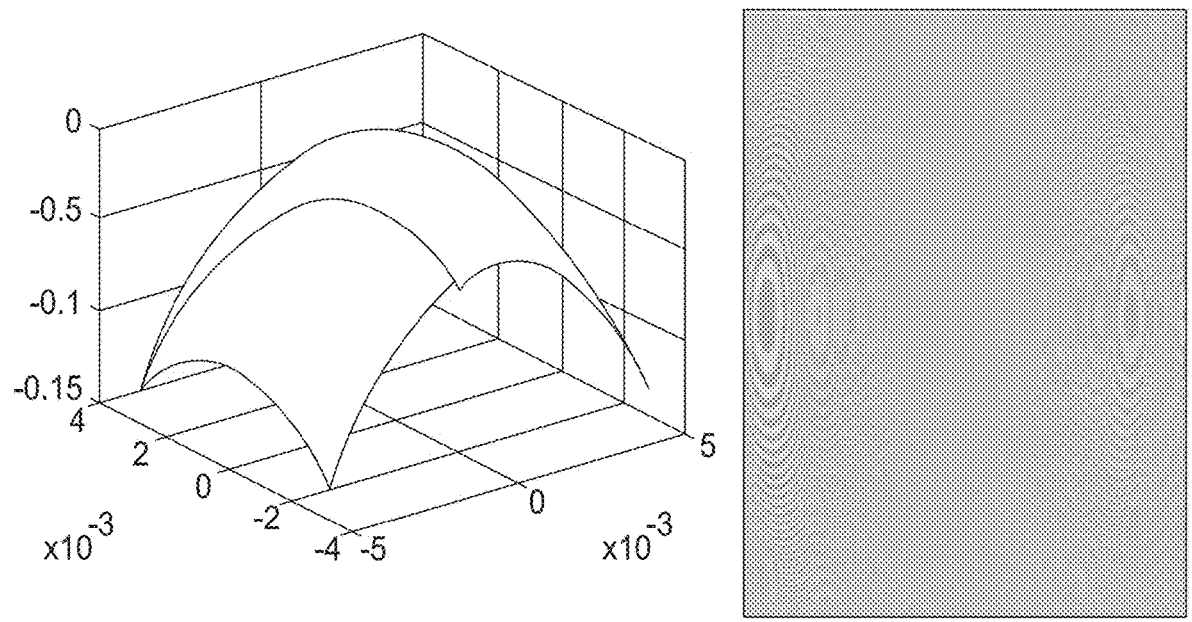
Figure 8:
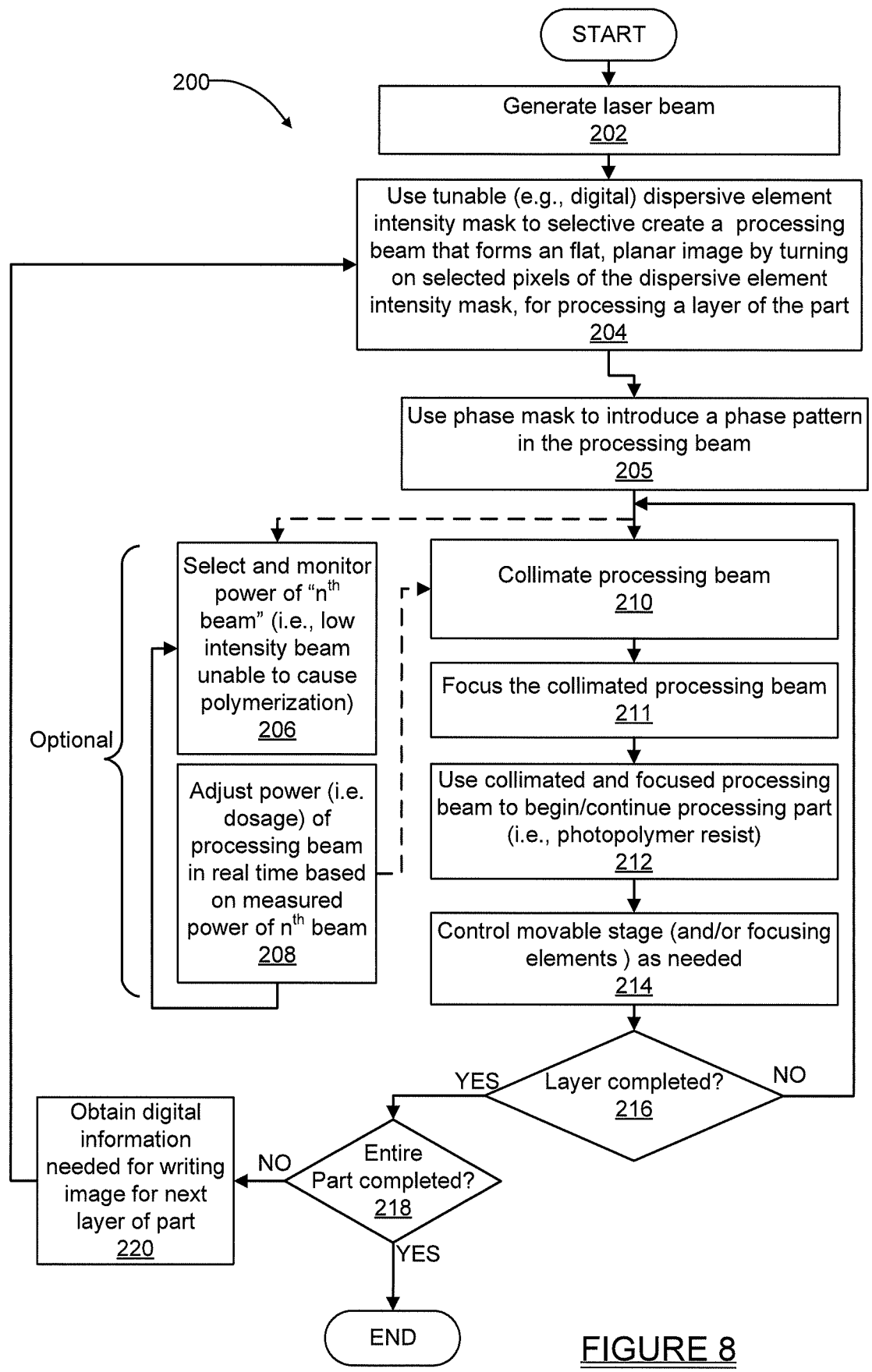

FIGS. 5C1 and 5C2 show the zoomed-in views of the focal region in which temporal focusing is observed;

FIG. 6 demonstrates the effect of spectral bandwidth of the laser on broadening of the pixel size;

FIGS. 7A-7D show examples of the computer generated hologram pattern that must be encoded on a phase mask to transform a planar light sheet into the corresponding curved light sheet; and FIG. 8 is a high level flowchart illustrating operations that may be performed by the present disclosure in generating a non-planar light sheet.

Corresponding reference numerals indicate corresponding parts throughout the several views of the drawings.

DETAILED DESCRIPTION

Example embodiments will now be described more fully with reference to the accompanying drawings.

The present disclosure addresses the above described limitations with convention two photon lithography ("TPL") by enabling the projection of curved surfaces during projection-based TPL. This has been accomplished in part by modifying the optical hardware of the parallel TPL system. Specifically, the present disclosure provides a TPL system which introduces an additional phase mask that modifies the intensity distribution of the projected light sheet. The intensity distribution is modified in such a way that the spatially and temporally focused image is formed on a curved surface instead of a flat surface. The mapping between the flat surface and the curved surface may be determined by phase information present on a phase mask. The principle of Lee holography is used to mathematically map the object to the curved image through the phase mask. Here, we have demonstrated printing of spherical surfaces by utilizing a fixed phase mask that maps a flat object to a spherical surface. This phase mask may be replaced with an electronically tunable spatial light modulator (SLM) to generate arbitrarily curved, focused images.

FIG. 1 shows one embodiment of a temporal focusing TPL system 10 for generating curved light sheets. The system 10 is expected to have a range of applications, but is expected to be particularly useful in additive manufacturing operations where an optical beam is used to act on a photopolymer material being supported on a substrate, to form a 3D part, typically in a layer-by-layer process. The system 10 shown in FIG. 1 shows an embodiment well suited for such an additive manufacturing operation.

The light source used by the system 10 may be a laser amplifier 12. In one specific embodiment the laser amplifier 12 may comprise a pulsed, 1 kHz regenerative femtosecond laser amplifier. Such a laser amplifier is available commercially from various sources, for example the Spitfire® laser amplifier system available from Spectra-Physics of Mountain View, Calif. The laser amplifier 12 generates a laser beam 14 which is fed into a beam expander 16 and expanded (i.e., the diameter of the beam is enlarged). The beam 14 may then be reflected by a first highly reflective mirror 18 and then may be fed into a beam homogenizer 20. The beam homogenizer 20 produces a laser beam having even better intensity uniformity. A second highly reflective mirror 22 may be used to reflect the beam 14 into a dispersion control unit 24. The dispersion control unit 24 may be included in the system 10 to compensate for the dispersion introduced by a phase mask 26. The phase mask 26 may be formed by, without limitation, a phase plate, a digital micro-mirror device, or a computer generated hologram (CGH) module, or other form of equivalent component. Phase masks, e.g., computer generated holography (CGH), are widely used to modulate the propagation properties of light. For example, first order phases can change the direction of the light wavefront, thereby guiding the light to propagate towards a certain direction. Second order phases can add a spherical wavefront to the incident light, and thus control the divergence of the incident light. By combining the first and second order phase modulation, one can direct the input beam to any point in a 3D space. Higher order phase modulations may be used to correct for aberration errors.

Next, a digitally electronically tunable dispersive element 28 disperses the laser beam 14 into a plurality of distinct beam components 14a, 14b, 14n, wherein each beam component results from diffraction and each has spatially separated optical spectral components. In this example, for simplicity, only the optical spectral components 14a1, 14a2 and 14a3 associated with beam component 14a are shown being used, although in practice a plurality of distinct beam components will be used by the system 10 in the same manner as described herein for beam component 14a. As noted herein, the dispersive element 28 may be a fixed grating, a flexible grating, a digital micro-mirror device (DMD), or a spatial light modulator (SLM). The dispersive element also performs a second function of patterning the beam by acting as an intensity mask. For example, when a DMD is used as the dispersive element, each diffracted beam emerging from the DMD has regions of high and low intensity corresponding to the pattern of "on" or "off" pixels on the DMD surface. An image of this high and low intensity pattern is projected onto the photopolymer material to print a layer. Within this layer, polymerization occurs only in those regions where the intensity is higher than a threshold value. Thus, polymerization occurs in only those regions that correspond to the cony pixels of the DMD.

The phase mask 26 is preferably placed at a distance "d" away (i.e., downstream relative to the direction of travel of the beam 14a) from the dispersive element 28. Defining the distance "d" is important for mathematically predicting the transformation from a planar light sheet (e.g., beam component 14a) to a non-planar light sheet.

The phase mask 26 outputs a modified beam 14a' which may be collimated by a concave mirror 30 and focused by an objective lens 32, in this example a 40X objective lens, to form a focused, collimated beam component 15 for use in polymerization on a sample 34 positioned on a movable stage 36. The mirror 30 and the objective lens 32 together form a focusing subsystem that focuses the beam component 15 into a non-planar light sheet. A lamp 38 may be used in connection with a zoom lens 46 to produce a light beam 38a which may be directed toward a camera, which in this example is a charge coupled display ("CCD") 48. An output of the CCD 48 may provide a signal used for imaging the sample 34 on an external display system, in order to observe the fabrication process in situ (i.e., to observe the action taking place on the sample 34). Beam splitter 44 directs the light 38a from the lamp 38 toward the zoom lens 46 and the CCD 48, but the beam splitter 44 has no effect on the beam component 15 directed toward the sample 34. It will also be appreciated that the light beam 38*a* from the lamp 38 is at a different wavelength than the light produced by the laser amplifier 12.

Figure 1A:
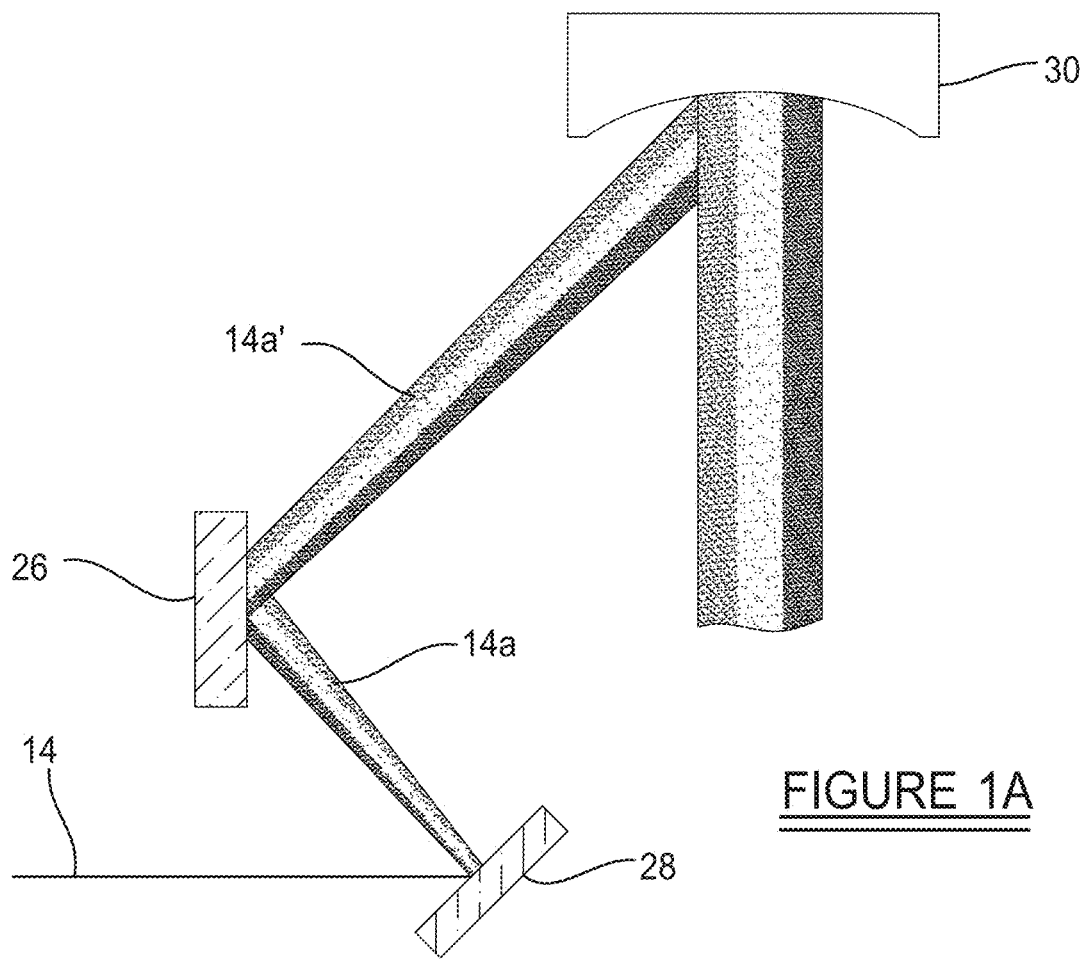
FIG. 1A is a high level diagram illustrating the relative orientation of the dispersive element, the phase mask and the collimating optics components shown in FIG. 1 when a reflective phase mask is used.

If a fixed phase plate is used as the phase mask 26, the fixed phase plate may be a custom-made lens containing the phase information required to modify the planar light sheet represented by beam component 14*a* into a specific curved surface, such as a hemispherical surface, as represented by beam component 15. If a high power liquid crystal spatial light modulator (e.g., an X10468 pure phase spatial light modulator from Hamamatsu Photonics of Hamamatsu City, JP) is available, the planar light sheet may be transformed into arbitrarily curved surfaces. When a phase plate comprising custom-made lenses is used, beam 14*a*' emerges after transmission through the phase mask. When a spatial light modulator (SLM) is used as the phase mask, the optical layout of the phase mask in system 10 must be modified such that beam 14*a*' emerges after reflection from the phase mask. This is illustrated in FIG. 1A, which shows the relative orientation of the dispersive element 28, the phase mask 26, and collimating optics 30 (e.g., concave mirror 30) when a reflective phase mask is used.

The system 10 may also include an electronic controller 40 having a non-volatile memory 42 (e.g., RAM or ROM). The electronic controller 40 may be used to control the laser amplifier 12, the phase mask 26, the dispersive element 28, the dispersion control component 24, the CCD 48, and the stage 36. The stage 36 comprises a stage which is movable in at least three planes axes (e.g., X, Y and Z planes). An additional Z-axis stage may be used to support the objective lens 32. Alternatively, two or more separate processors may be used to control the just-described components and elements. The signal from the CCD camera 48 may be used to monitor the fabrication process and perform closed loop control of the phase mask, the dispersive element, or the stage 36.

Optionally, the system 10 may include a beam power control unit 49 that monitors the power of an nth beam which is not being used to form an image. The beam power control unit 49 may provide a feedback signal to the electronic controller which is used for controlling the power of the beam 14. The power of the beam 14 may be controlled by either adding neutral density filters in the optical path or by rotating the plane of polarization of the beam and filtering out one of the two polarizations (i.e., by selecting only horizontal or vertical polarization from a mixture of vertical and horizontal polarizations).

Figures 2A, 2B:
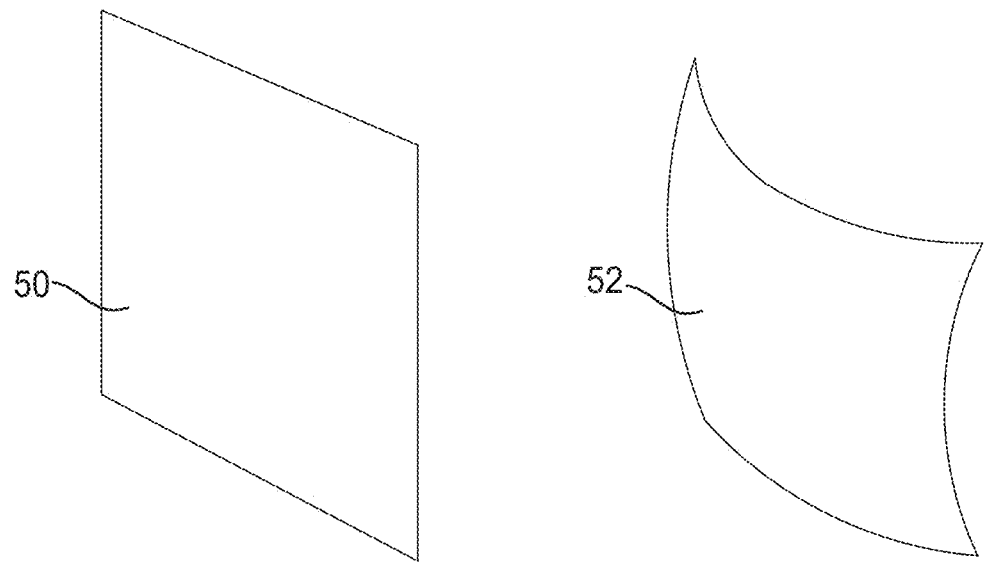
FIG. 2A shows a planar light sheet that may be generated using the system of the present disclosure.
FIG. 2B shows one example of how the planar light sheet of FIG. 2A is modified by the system of the present disclosure to form a non-planar light sheet.

FIG. 2A presents an image of a planar surface 50 that is fabricated with no modifications to the beam component 14*a* of the system 10, and thus forms a planar layer. In this case, the phase mask 26 is removed from the optical path. Without the phase mask 26, the system 10 reduces to a parallel two-photon polymerization system that projects planar layers and relies on temporal focusing (i.e., focusing in the time domain) to achieve micron scale depth resolutions. This planar temporal focusing projection system has been previously disclosed in the US patent application number U.S. Ser. No. 15/857,917 titled "System and Method for Submicron Additive Manufacturing", the entire contents of which are incorporated herein by reference. FIG. 2B is a simplified example of a non-planar (i.e., non-flat) layer 52 that is formed using the system 10 through the use of the phase mask 26 and the focusing subsystem (i.e., curved mirror 30 and objective lens 32) to create the beam component 15. The phase information on the phase mask is selected such that the depth resolvability due to temporal focusing is preserved during the projection of curved light sheets. Thus, curved layers with micron scale depth resolution can be fabricated with the system 10.

Figure 3:
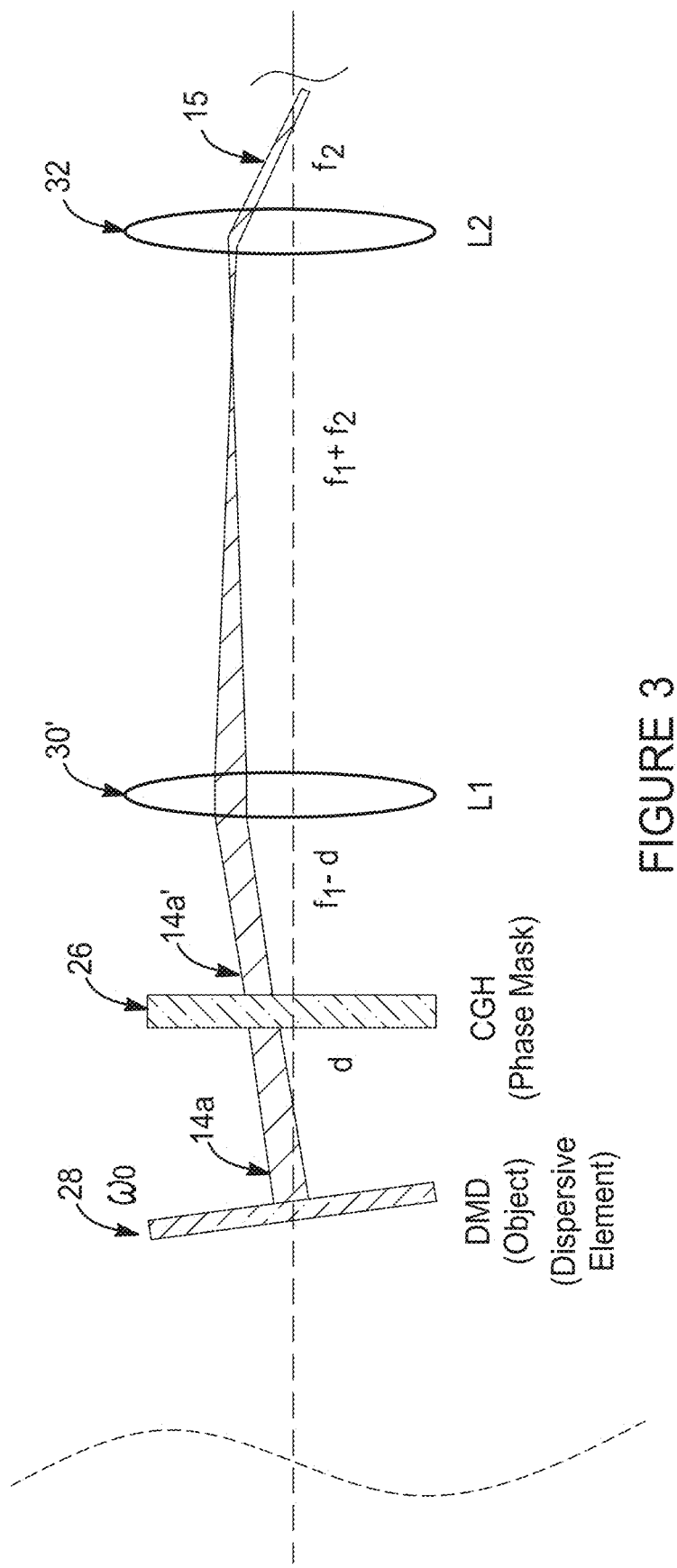
FIG. 3 is a high level schematic representation showing how the laser beam is modified to form the non-planar light sheet.

FIG. 3 presents a high level diagram representing an optical method in accordance with the present disclosure of projecting a flat object onto an arbitrarily curved surface, where the object is illuminated by the laser beam 14. The phase mask 26 (i.e., computer-generated hologram (CGH)), encoded with the target surface profile, is positioned to the right of the dispersive element 28 and separated by a predetermined distance "d". A telescope system is formed by the lens 30' and objective lens 32, in combination with a computer generated hologram (CGH), which forms the real non-planar image 52 on a curved imaging surface to the right of objective lens 32. Accordingly, the planar focal plane can be engineered into arbitrary surface shapes, e.g., spherical surface, via use of the phase mask 26 as shown in FIG. 1.

Figure 4:
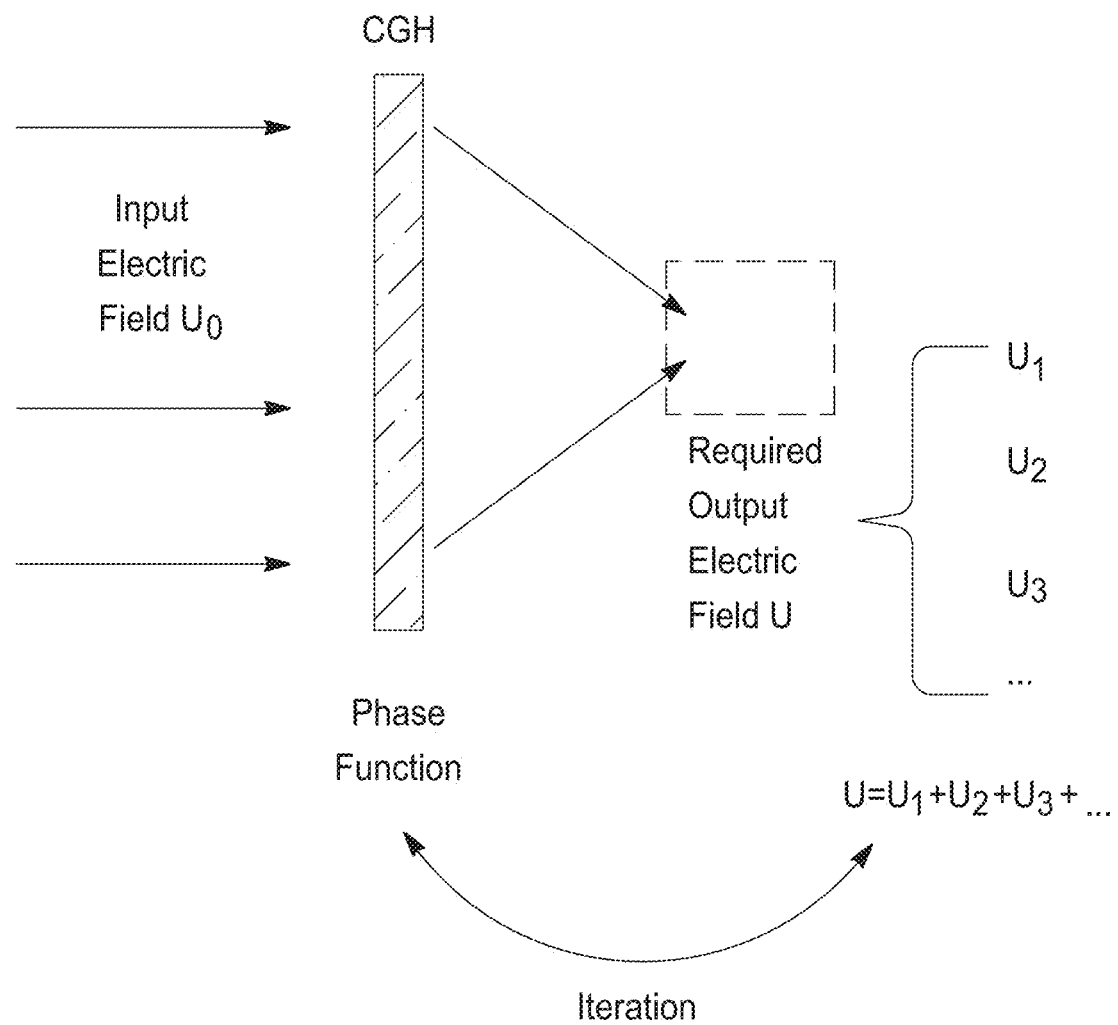
FIG. 4 shows the principle of calculating the phase functions that must be encoded on the phase mask to transform planar light sheets into non-planar light sheets.

Generating the right phase information to be encoded on the phase mask that causes the desired phase modification of the beam is often complicated. As analytical solutions may not exist, approximate optimization techniques are frequently used in solving practical problems. Here, a new method to obtain phase masks for imaging and fabrication applications is presented. As shown in FIG. 4, let $U_0$ be the input electric field and U be the desired output electric field. The goal is to obtain the optimal phase function to be encoded on phase mask (e.g., spatial light modulators) that can modulate (i.e., transform) $U_0$ to U. The procedure consists of three steps:

Step I: The desired output electric field should be studied to first identify the principal components ($U_1$, $U_2$, $U_3$, . . . ) that can approximately represent U. The principal components can be found by decomposing the output field U based on the specific application. This is illustrated in FIG. 4.

Step II: An iterative process may be used to obtain the phase function. The initial values of the iteration for U are the principal components identified in Step I. For example, the initial point of the iteration for phase function can be a simple combination of the first and second order phases. The relationship between the input, output electric field and the phase function can be constructed via Fresnel propagation.

Step III: When aberrations are observed in the experiments, additional phase functions can be added to improve the results. Note that the optimal value will be found through the iteration processes described in Step II.

For example, a phase function, which can control and bend the flat imaging plane into a curved spherical surface in a temporal focusing fabrication or imaging system, can be obtained via the procedure described above. In this system, the principal components that are critical to forming a curved electric field in the focal volume include: (a) imaging the pattern programmed to the DMD onto a desired curved surface, (b) all spectral components of the femtosecond laser must be recombined to ensure high axial resolution, (c) all the spectral components are in phase, and (d) the bandwidth issue needs to be considered. Each of these is discussed in detail next.

For the purpose of phase mask generation, the intensity pattern encoded on the DMD (dispersive element 28) can be considered as an object. Different portions of the computer generated hologram (CGH) will act as lenses with different focal lengths that will image the corresponding portions of the object at different depths. Thus, the whole object will be projected onto a curved surface. FIG. 3 presents the optical schematic. The object on DMD plane will first generate a virtual image on a curved plane by the CGH, and then pass the afocal system (collimating lens 30' and objective lens 32)

to generate a curved surface in the focal volume. The collimating lens 30' is functionally equivalent to the collimating concave mirror 30 in FIG. 1. In practice, the CGH can be a liquid crystal spatial light modulator or a DMD.

If the virtual image formed by the CGH is located at $z_i$ (x, y) from the CGH, and f(x, y) is the required focal length on the CGH at (x,y) location, we have:

$$-\frac{1}{d} + \frac{1}{z_i(x, y)} = \frac{1}{f(x, y)}$$

Passing through the lens system and assuming the real curved surface is z(x, y), M is the magnification of the a focal lens system, then we have:

$$z(x, y) = m^2[z_i(x, y) - d] = \frac{m^2 d^2}{f(x, y) - d}$$

Given a required curved surface z(x, y), we can now calculate the phase function on the CGH. The (x, y) location on the CGH should function as a lens with focal length f(x, y) as calculated above. That is, a phase of:

$$\varphi(x, y) = \exp\left[\frac{j\pi(x^2 + y^2)}{\lambda f(x, y)}\right]$$

The goal of temporal focusing is to broaden the pulse width everywhere except at the focal plane. Accordingly, all spectral components of the femtosecond laser must be present at the focal region in order to generate the depth-resolved thin light sheet. Failure to recombine all spectral components will lead to light sheet broadening and polymerization of a thick layer of the photopolymer material. As shown in FIGS. 5A-5C2, for a specific spectral component (i.e., a specific wavelength λ), the beam will be guided to a specific direction after emerging from the dispersive element 28, but still as a collimated beam. The collimating lens 30' and the objective lens 32 together function as a 4-f beam expanding system. After the objective lens, the monochromatic beam becomes a collimated beam with a beam diameter $$\omega_1 = \omega_0 \cdot \frac{f_{objective\ lens}}{f_{collimating\ lens}}.$$

For different wavelengths, they are first separated by the dispersive element 28, collimated by a collimating lens 30', and then combined by an objective lens 32. The prerequisites of generating a temporally focused plane is to be in the overlap region of all wavelengths as shown in FIG. 5C1, which is constrained by the monochromatic beam size ω and the convergent angle of the different spectral components (determined by the focal length and numerical aperture of objective lens 32). The temporally focused plane can only occur within $z=z_{max}$.

The encoded phase function on the CGH affects the divergence of the beam. As shown in FIG. 5B, the departing beam would be divergent with an angle $\theta_1$.

$$\theta_1 = \arctan\left(\frac{\omega_0}{2f}\right)$$

After passing through the afocal lens system, the beam of size ω enters the objective lens with a diverging angle $\theta_2$, which can be calculated with similarity and imaging laws. These two factors define the new region over which the temporally focused light sheet can be generated as shown in the zoomed-in view in FIG. 5C2. This is the second factor limiting the phase function: the effect it has on monochromatic beams determines a new region over which temporal focusing can be achieved.

To obtain a sharp temporally focused light sheet, all spectral components must be in phase. One major issue is that the CGH can only add one phase function φ for the entire input beam. As the input beam has a non-zero spectral bandwidth and the phase function is wavelength dependent, this generates a phase difference when the ideal wavelength-specific phase (φ(λ)) differs from the applied phase function φ. In the focal volume, the final electric field is the weak coherency result of all the wavelengths as shown below.

$$U(x, y, z, t) = \int_{-\Delta\omega}^{\Delta k} U_f(x, y, \Delta k; z) \exp(ick_0 t) d(\Delta k) = \tilde{\mathcal{F}}[U_f(x, y, \Delta k; z)]$$

This difference in ideal versus applied phase will induce aberrations that deteriorate the quality of temporal focusing. An optimal φ should minimize such deterioration, and this is the third merit function that must be considered to optimize the phase function.

To apply a phase function onto the CGH, the CGH is discretized into pixels. In addition, the intensity mask dispersion element 28 is also discretized into pixels to pattern the intensity of the beam. Due to this discretization of the dispersion element and the broadband nature of the laser source, the beam emitted from the object (i.e., dispersion element 28) has a small numerical aperture (or a small divergent angle), and may strike a larger area s on the CGH where s=NA*d as shown in FIG. 6. Errors due to discretization are minimized when s is as small as a pitch size on the CGH. If not, a pixel on the object is affected by all the pixels on the CGH within this areas.

A desired phase function is obtained by optimizing for all of the following factors/variables: (a) desired curved surface, (b) recombination of all spectral components, (c) minimization of phase difference across the spectral components, and (d) minimization of aberrations due to large bandwidth of the laser. The merit function to optimize the phase mask may be a combination of all of these four factors. For aberration correction, aberrations may be directly measured in two photon polymerization fabrication experiments through measurement of the point spread function or indirectly through quality of printing. Based on these measurements, an additional phase function may be added to improve the quality of printing.

The results of the above method for the case of monochromatic light source are shown in FIGS. 7A-7D. In each of FIGS. 7A-7D, the left panels represent the desired curved surfaces to be obtained by transforming planar light sheets through a phase mask, and the right panels represent the corresponding pattern on the phase mask that would generate the desired curved surface.

Referring to FIG. 8 a high level flowchart 200 is provided to illustrate major operations performed by the system 10 in carrying out the methodology of the present disclosure and creating a non-planar image. At operation 202 laser beam 14 (e.g., which may be a pulsed laser beam) is generated. At operation 204 the digitally tunable dispersive element 28 may be used to digitize the beam (i.e., generate an intensity pattern in the beam) and to produce the plurality of the beam components 14a, 14b, etc. (i.e., discretely pattern subsections of the beam to have high versus low intensities). The intensity pattern in the beam is generated by selectively turning on only specific ones of the pixels within the dispersive element 28 to use in processing a layer of the part (i.e., a layer of the sample 34).

At operation 205 the phase mask 26 receives the beam component 14a and modifies the planar image of the beam component 14a into a non-planar image.

Optionally, one of the beams (i.e., $14n^{th}$ in this example) is not being used for processing (i.e., the "$n^{th}$ diffracted mode"), and may be selected and its power monitored by the electronic controller 40, as indicated at operation 206. Also optionally, if operation 206 is performed, then at operation 208 the power of the beam may be adjusted in real time based on the measured power of the $14n^{th}$ beam.

At operation 210 the beam 14a' may be collimated and focused to form the beam component 15. At operation 212 the beam component 15 may be used to begin/continue processing an entire layer within or on the sample (i.e., the photopolymer resist) in parallel. At operation 214 the movable stage 36 and/or the focusing elements (e.g., the objective lens 32) may be controlled as needed during the polymerization process. At operation 216 a check is made if the present layer being processed has been completed, and if not operations 206-216 may be repeated. If the check for completion of processing of the current layer at operation 216 produces a "Yes" answer, then a check is made at operation 218 if the entire sample part is complete (i.e., all layers processed/formed). If the check at operation 218 produces a "Yes", answer, then the process ends, but if the check at operation 218 produces a "No" answer, then digital information for writing the next layer of the part may be obtained, as indicated at operation 220, and operations 204-216 may be repeated to write out the next layer. To synchronize the various components of the system including the tunable intensity mask (i.e., dispersive element 28) and phase mask 26, the controller 40 may wait for synchronization signals from the motion stages (for sample or objective), or the camera from the imaging system, or for trigger signals from internal or external clocks (such as the pulsed laser itself). Without synchronization, printing in undesired locations of the resist material may be observed.

The present system and method 10 thus provides a new optical method and system to engineer a collimated, focused light sheet into a curved surface. Experiments have been performed via both continuous wave laser and regenerative laser amplifier to verify the teachings presented herein. In various experiments a phase plate was used to control the light sheet 15 into a spherical geometry, which may be replaced by a high damage threshold LC-SLM to achieve the capability to arbitrarily curve the focal plane.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A laser-based manufacturing system for fabricating non-planar three-dimensional layers, the system comprising:
   a laser for producing a laser beam with a plurality of optical wavelengths;
   an optically dispersive element for receiving the laser beam and splitting the laser beam into a diverging beam having a plurality of distinct beam components of differing wavelengths, wherein each said beam component has spatially separated optical spectral components;
   a phase mask spaced from the optically dispersive element by a predetermined distance, and configured to receive at least one of the distinct beam components emerging from the optically dispersive element and to generate a diverging modified beam which defines a planar light sheet; and
   one or more focusing elements configured to receive the diverging modified beam emerging from the phase mask and to focus the diverging modified beam into a focused beam at a focal region, and wherein at the focal region the focused beam defines a non-planar light sheet; and
   wherein the one or more focusing elements include a collimating optic and an objective lens operating together as a beam expanding subsystem which recombines all optical spectral components of the distinct beam components at a common, overlapping region, and wherein the common overlapping region represents the focal region; and
   wherein the predetermined distance is used to help predict a transformation of the diverging modified beam from the planar light sheet to the non-planar light sheet.

2. The system of claim 1, wherein the one or more focusing elements includes a mirror.

3. The system of claim 1, wherein the mirror comprises a curved mirror.

4. The system of claim 1, wherein the one or more focusing elements includes:
   a mirror for receiving the diverging modified beam from the phase mask; and
   the objective lens being arranged for receiving the diverging modified beam after the diverging modified beam has been reflected by the mirror.

5. The system of claim 1, wherein the optically dispersive element comprises a fixed grating or a flexible grating.

6. The system of claim 1, wherein the optically dispersive element comprises a digital micro-mirror device (DMD) or a spatial light modulator (SLM).

7. The system of claim 1, wherein the optically dispersive element patterns each of said distinct beam components into regions of high and low intensity.

8. The system of claim 1, wherein the phase mask comprises a phase plate.

9. The system of claim 1, wherein the phase mask comprises at least one of a digital micro-mirror device (DMD) or a spatial light modulator (SLM).

10. The system of claim 1, wherein the phase mask comprises a computer generated hologram (CGH) module.

11. The system of claim 1, further comprising an electronic controller for controlling at least one of: the laser, the optically dispersive element and the phase mask.

12. The system of claim 1, further comprising a movable stage for supporting a material to be acted upon by the non-planar light sheet.

13. The system of claim 1, further comprising:
   a lamp for generating a light beam for illuminating a material being acted on by the non-planar light sheet;
   a camera; and
   a beam splitter for directing the light beam from the lamp toward the camera, wherein an output from the camera is used to image the material, in situ, being operated on by the non-planar light sheet.

14. The system of claim 1 further comprising a beam expander configured to expand the laser beam produced by the laser.

15. The system of claim 1, further comprising a beam homogenizer for acting on the laser beam to improve an intensity uniformity of the laser beam.

16. A laser-based manufacturing system for fabricating non-planar three-dimensional layers, the system comprising:
   a laser for producing a laser beam with a plurality of optical wavelengths;
   an optically dispersive element for receiving the laser beam and splitting the laser beam into a plurality of distinct beam components of differing wavelengths, to form an a diverging beam, wherein each one of said plurality of beam components has spatially separated optical spectral components and the diverging beam forms a planar light sheet;
   a digitally tunable phase mask separated by a predetermined distance from the optically dispersive element, and configured to receive at least one of the distinct beam components emerging from the optically dispersive element, and to generate a modified, diverging beam in accordance with a desired non-planar light sheet;
   a controller for controlling the digitally tunable phase mask; and
   a focusing subsystem including a mirror and an objective lens configured to receive the modified, diverging beam emerging from the digitally tunable phase mask and to focus the modified, diverging beam into the desired non-planar light sheet; and
   wherein the focusing subsystem includes a collimating optic and an objective lens operating together as a beam expanding subsystem which recombines all optical spectral components of the distinct beam components at a common, overlapping region, and wherein the common overlapping region represents a focal region; and
   wherein the distance separating the optically dispersive element from the digitally tunable phase mask is used to predict a transformation from the planar light sheet to the desired non-planar light sheet.

17. The system of claim 16, further comprising a camera for imaging an operation performed using the desired non-planar light sheet on a material.

18. The system of claim 16, wherein the digitally tunable phase mask comprises one of:
   a phase plate;
   a digital micro-mirror device (DMD);
   a spatial light modulator (SLM); or
   a computer generated hologram module.

19. The system of claim 16, wherein the optically dispersive element comprises one of:

a fixed grating;
a flexible grating;
a digital micro-mirror device; or
a spatial light modulator (SLM).

* * * * *